United States Patent
Shichida et al.

(10) Patent No.: US 6,490,149 B2
(45) Date of Patent: Dec. 3, 2002

(54) DRAWING APPARATUS FOR A DRAWER TYPE ELECTRICAL MACHINERY

(75) Inventors: Coichi Shichida, Tokyo (JP); Tomotaka Yano, Tokyo (JP); Yuichi Yamaji, Tokyo (JP); Takashi Sekiya, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 37 days.

(21) Appl. No.: 09/768,228

(22) Filed: Jan. 25, 2001

(65) Prior Publication Data

US 2002/0097551 A1 Jul. 25, 2002

(51) Int. Cl.7 ................................................ H02B 5/00
(52) U.S. Cl. ....................... 361/605; 361/604; 361/625; 200/50.21; 335/185
(58) Field of Search ................................ 361/604–625; 200/85 B, 50.21–50.32; 335/185–195; 192/141; H02B 11/06, 11/07, 11/08, 11/09, 11/10, 11/11, 11/12, 11/13, 11/14, 11/15, 11/16, 11/17, 11/18, 11/19, 11/20, 11/21, 11/22, 11/23, 11/24

(56) References Cited

U.S. PATENT DOCUMENTS

| | | | | |
|---|---|---|---|---|
| 2,885,502 A | * | 5/1959 | Eichelberger et al. | ......... 200/50 |
| 3,219,771 A | * | 11/1965 | Umphrey | ...................... 200/50 |
| 3,710,044 A | * | 1/1973 | Sharp | ..................... 200/50 AA |
| 3,783,209 A | * | 1/1974 | Cleaveland et al. | ....... 200/50 A |
| 4,317,160 A | * | 2/1982 | Tillson et al. | ................ 361/339 |
| 4,396,813 A | * | 8/1983 | Hesselbart et al. | ..... 200/50 AA |
| 4,743,715 A | | 5/1988 | Gerbert-Gaillard et al. | |
| 5,278,722 A | * | 1/1994 | Peruso | ......................... 361/606 |
| 5,459,293 A | * | 10/1995 | Hodkin et al. | .......... 200/50 AA |
| 6,031,192 A | * | 2/2000 | Liebertruth | ............... 200/50.21 |
| 6,066,814 A | * | 5/2000 | Smith et al. | .............. 200/50.24 |

FOREIGN PATENT DOCUMENTS

| | | | |
|---|---|---|---|
| DE | 43 31 78 | 10/1994 | |
| EP | 0 045 545 | 2/1982 | |
| EP | 0 685 913 | 12/1995 | |
| GB | 2 067 840 A | * 1/1980 | ........... H02B/11/06 |
| JP | 48-43931 U1 | 9/1973 | |
| JP | 3007006 A | 1/1991 | |
| JP | 4285414 A | 10/1992 | |
| JP | 406165323 A | * 6/1994 | ........... H02B/11/24 |
| JP | 6-68275 | 9/1994 | |

\* cited by examiner

Primary Examiner—Lynn D. Feild
Assistant Examiner—Michael Datskovsky
(74) Attorney, Agent, or Firm—Sughrue Mion, PLLC

(57) ABSTRACT

A drawing apparatus constructed such that a screw rod 17 having an axis center along a drawing direction of an electrical machinery 1 is rotatably supported by a floor portion 11a of a drawing type electrical machinery accommodating portion 11 of a switch gear, a nut 19 engaged with a lower portion of the electrical machinery 1 is screwed with the screw rod 17, the nut 19 is moved by rotating the screw rod 17, and the electrical machinery 1 is driven in a direction of inserting or drawing out, whereby the drawing apparatus is commonly used for various drawing-type electrical machineries regardless of sizes of the electrical machineries.

8 Claims, 8 Drawing Sheets making and breaking state detecting means including 27, 27a, 27b, 27c, 27d, 27f, and 28

DRAWING APPARATUS FOR A DRAWER TYPE ELECTRICAL MACHINERY

BACKGROUND OF THE INVENTION

1. Field of the Invention

The present invention relates to a drawing apparatus for inserting and drawing out an electrical machinery of a drawer type, which is accommodated in switch gear.

2. Discussion of Background

FIG. 8 is a perspective view illustrating a conventional drawing apparatus disclosed in, for example, Japanese Unexamined Utility Model Publication JP-A-48-43931. In FIG. 8, numerical reference 1 designates a breaker; numerical reference 2 designates a screw rod, penetrating through a dolly of the breaker 1 so as to be rotatable; numerical reference 3 designates a nut located on a side of a switch gear; and numerical reference 4 designates a handle, engaged with the screw rod 2, for rotating the screw rod 2.

When the breaker is inserted in the switch gear, the screw rod is made in contact with the nut 3, and the handle 4 is turned to rotate the screw rod 2, whereby the screw rod 2 is screwed into the nut 3. Because the nut 3 is fixed to the switch gear (not shown), the breaker is drawn into the switch gear along with the rotation of the screw rod 2. By rotating the screw rod 2 in a direction adverse to described above, the nut 3 is moved relatively left in FIG. 8, whereby the breaker 1 is drawn out of the switch gear.

However, the conventional apparatus has a problem that various types of screw rods, corresponding to various sizes of breakers, are necessary because a length of the screw rod is determined by an overall depth of the breaker or a distance between a breaking position and a making position of the switch gear. Further, there is a problem that a large space should be prepared in a manufacturing factory, and at time of installing and transporting.

SUMMARY OF THE INVENTION

It is an object of the present invention to solve the above-mentioned problems inherent in the conventional technique and to provide a drawing apparatus which can deal with breakers having any size without changing components of the drawing apparatus.

Another object of the present invention is to provide a drawing apparatus which can be easily installed inside switch gear.

Another object of the present invention is to provide a drawing apparatus, which can be safely operated by detecting making and breaking states of a switch.

Another object of the present invention is to provide a means for detecting making and breaking states, which can securely detect the making and breaking states of a switch in a simple structure.

Another object of the present invention is to provide a shutter which can easily realize an operation interlocked with a means for detecting making and breaking states.

Another object of the present invention is to provide a drawing apparatus which can be easily assembled.

According to a first aspect of the present invention, there is provided a drawing apparatus comprising: a screw rod rotatably supported around an axis center along a direction of drawing an electrical machinery; and a nut engaged with the electrical machinery, screwed with the screw rod, and driving the electrical machinery in a direction of inserting or drawing out by moving the electrical machinery of a drawing type in directions of inserting and drawing out upon the rotation of the screw rod.

According to a second aspect of the present invention, there is provided a drawing apparatus comprising: a screw rod supported by a floor of an electrical machinery room so as to be rotatable around an axis center along a direction of drawing out the electrical machinery; and a nut engaging a lower portion of the electrical machinery in directions of inserting and drawing out, screwed with the screw rod, and driving the electrical machinery in the directions of inserting and drawing out the electrical machinery by moving the electrical machinery upon the rotation of the screw rod.

According to a third aspect of the present invention, there is provided a drawing apparatus comprising: a screw rod rotatably supported around an axis center along a drawing direction of a switch; a nut engaged with the switch, screwed with the screw rod, and driving the switch in directions of inserting and drawing out the switch by moving the switch in the directions; a making and breaking state detecting means detecting making and breaking states of the switch; and a shutter closing a front surface of a driving portion of the screw rod, engaged with the making and breaking state detecting means on one side thereof, and being movable in a position of releasing the front surface of the driving portion of the screw rod only in case that the making and breaking state detecting means detects the breaking state.

According to a fourth aspect of the present invention, there is provided the drawing apparatus, wherein the making and breaking state detecting means comprising: an interlocking member installed in the switch and moving between making and breaking positions of the switch; and an interlocking rod having a shaft rotatably supported in parallel with the screw rod, an arm-like detector, rotated along with the shaft, engaged with the interlocking member, and detecting the making and breaking states of the switch, and an arm-like actuator located in one end of the shaft and outputting a detected state.

According to a fifth aspect of the present invention, there is provided the drawing apparatus, wherein the shutter is located on a front surface of a driving portion of the screw rod so as to be freely slidable in directions perpendicular to a longitudinal direction of the screw rod, and the shutter is rotated in a direction that the interlocking rod is in contact with the interlocking member of the switch by an engagement between one side of the shutter and a roller, located in a tip of a displaying portion of the interlocking rod of the making and breaking state detecting means in case that the shutter slides in a direction of releasing the front surface of the driving portion.

According to a sixth aspect of the present invention, there is provided the drawing apparatus, wherein the screw rod, the making and breaking state detecting means, and the shutter are constructed to be a single unit on a common base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 7 as follows, wherein the same numerical references are used for the same or similar portions and description of these portions is omitted.

Embodiment 1

Figure 1:
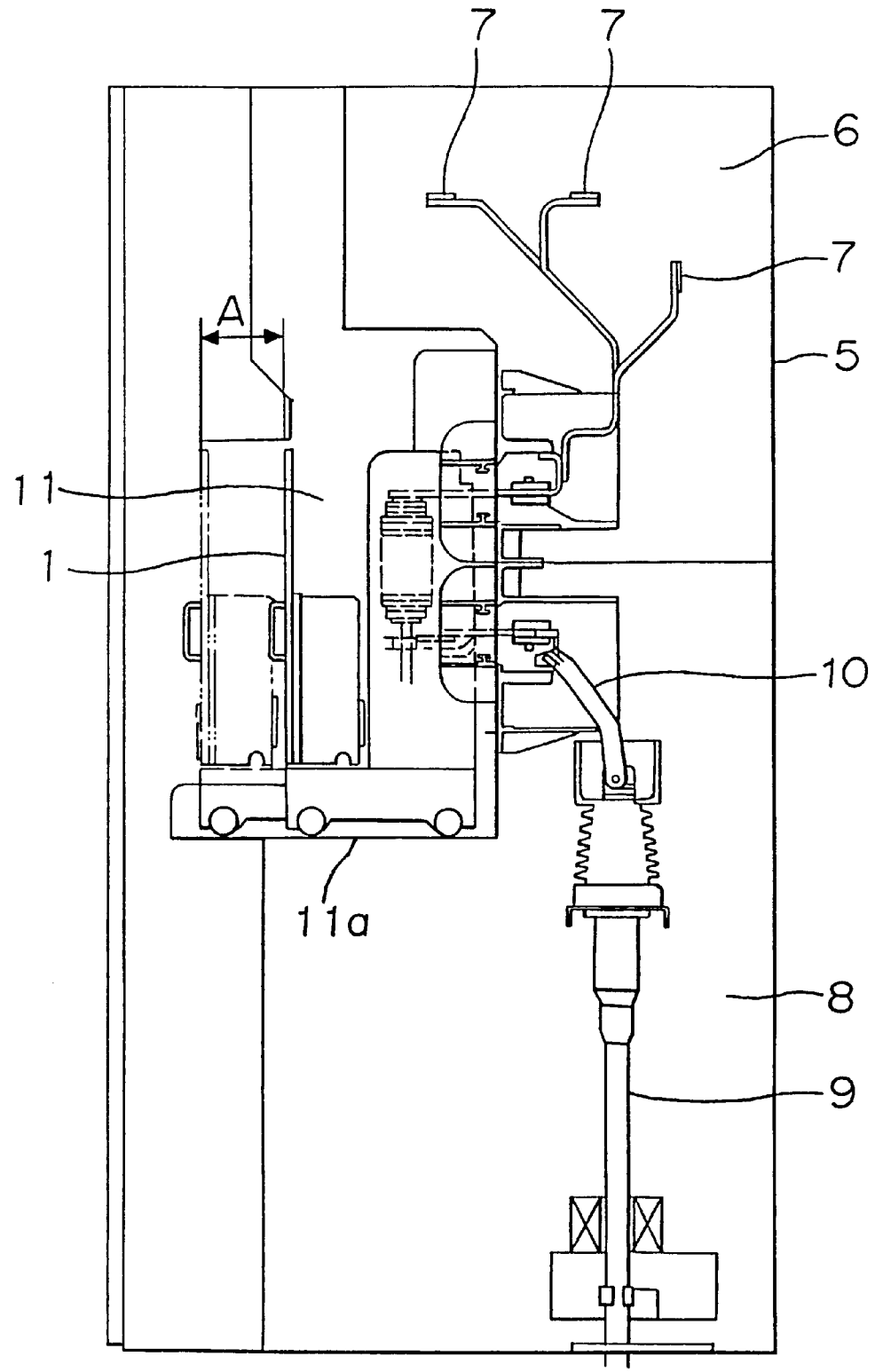
FIG. 1 is a side cross-sectional view of switch gear according to Embodiment 1 of the present invention.

FIGS. 1 through 7 illustrate a drawing apparatus according to Embodiment 1 of the present invention. FIG. 1 illustrates a state that a drawing type breaker is assembled in a switch gear. Numerical reference 5 designates a casing; numerical reference 6 designates a bus-bar room accommodating a bus bar 7 arranged in a depth direction in FIG. 1; numerical reference 8 designates a cable room accommodating a cable 9 and a disconnector 10; numerical reference 11 designates a breaker room accommodating a breaker 1; and numerical reference 11a designates a floor plate of the breaker room 11. The breaker 1 is movable from a connecting position illustrated in FIG. 1 to a disconnecting position leftward positioned from the connecting position by a distance A. Needless to say that at time of checking the breaker 1, the breaker 1 is further drawn in a leftward direction or taken out of the switch gear using tools (not shown). Numerical reference 12 designates contacts mounted on tips of main circuit terminals of the breaker 1, which are in contact with a terminal 13 on a bus bar side and a terminal 14 on a breaker side. When the breaker 1 is drawn out at the disconnecting position, the contacts 12 are separated from the terminals 13 and 14.

Figure 2:
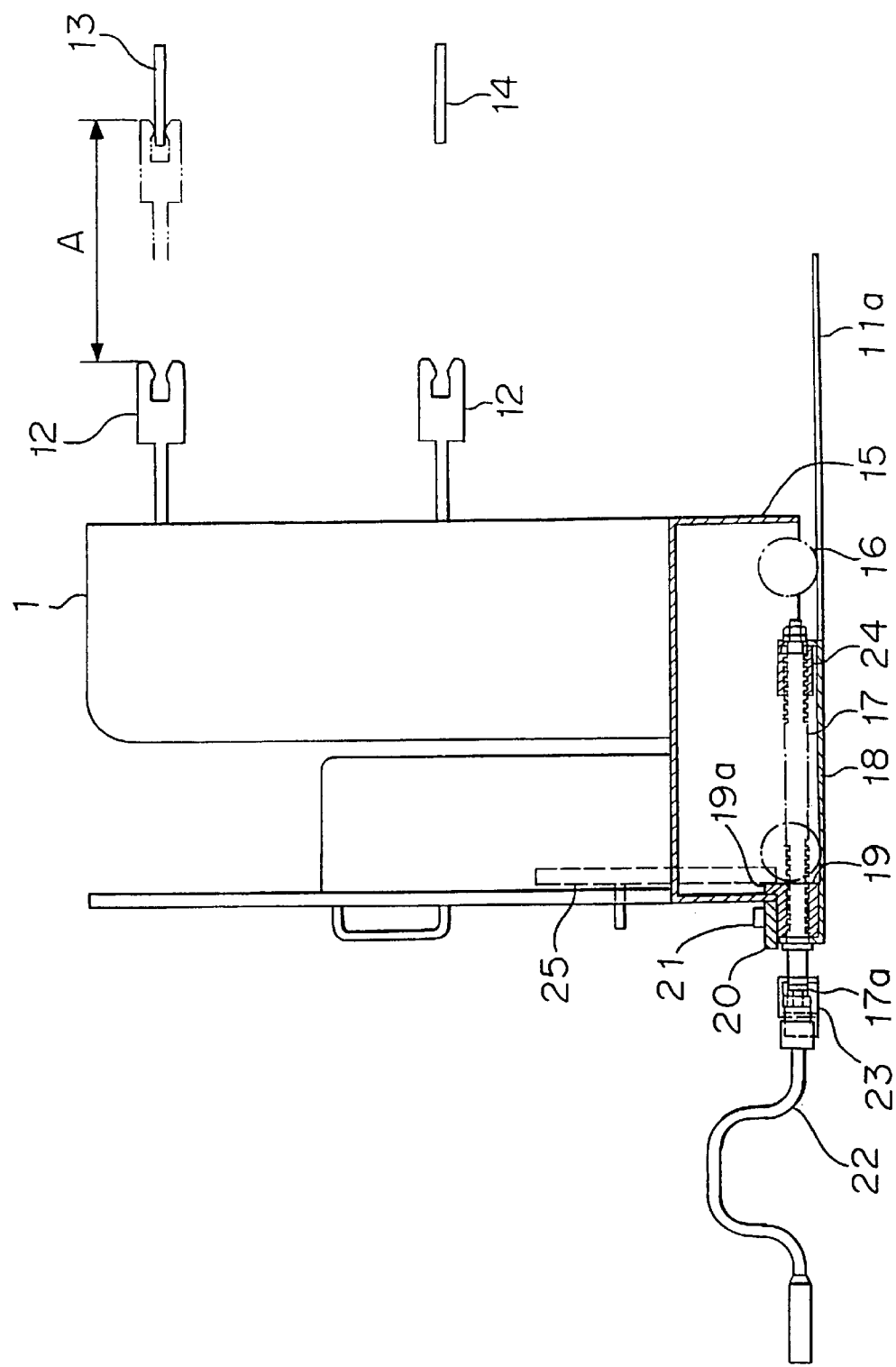
FIG. 2 is a side cross-sectional view illustrating a state of drawing out a breaker in a breaker room according to Embodiment 1 of the present invention.
Figure 3:
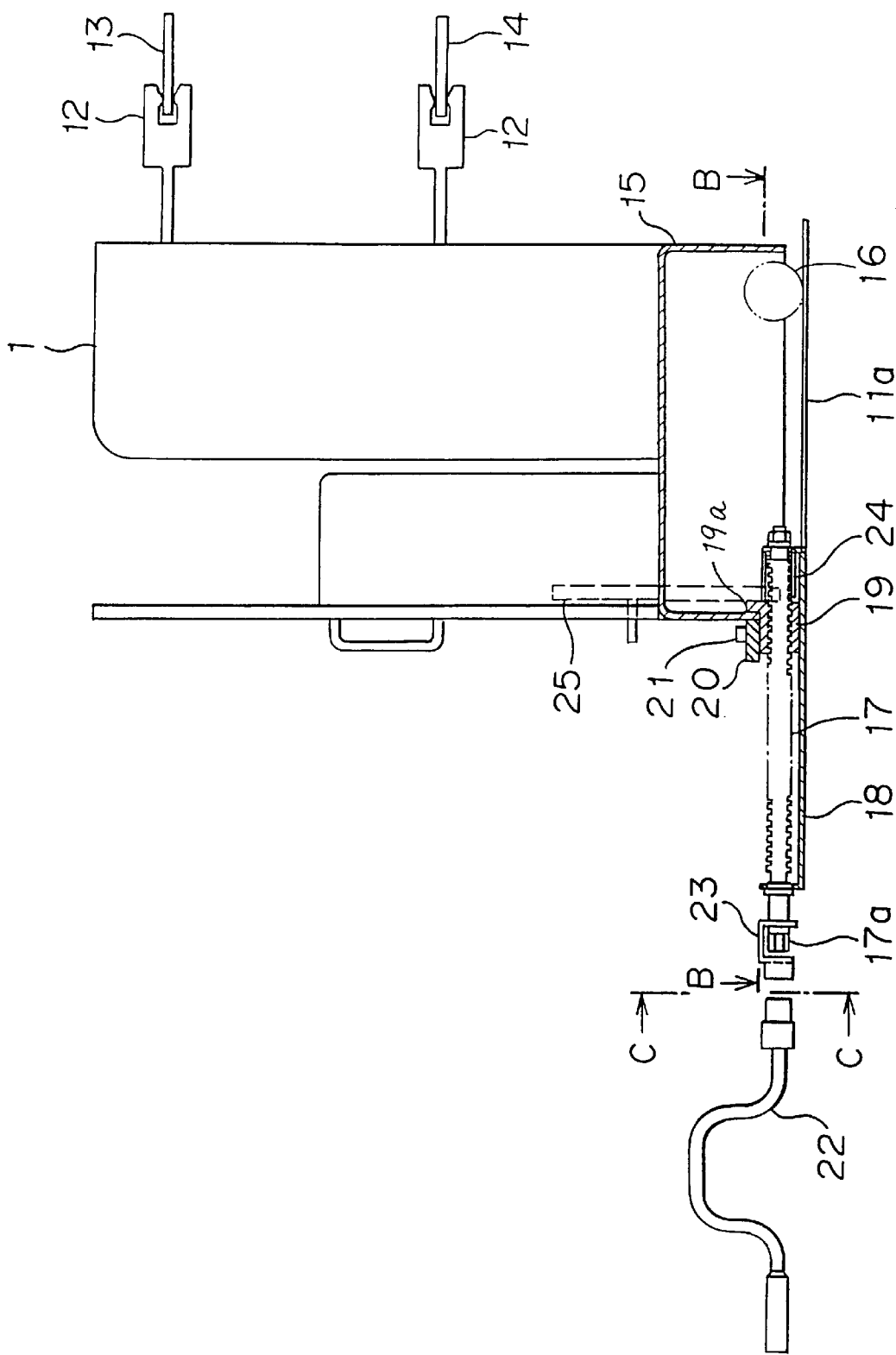
FIG. 3 is a side cross-sectional view in a state transited from the state of drawing out in FIG. 2 to a state of inserting the breaker.

FIG. 2 illustrates a state that the breaker is in the disconnecting position. FIG. 3 illustrates a state that the breaker is in the connecting position. In FIGS. 2 and 3, numerical reference 15 designates a dolly frame in a box shape, which is arranged in a lower portion of the breaker 1. Numerical reference 16 designates wheels located on both sides of the dolly frame 15 for moving the dolly frame 15. Numerical reference 17 designates a screw rod. Numerical reference 18 designates a supporting member attached to a floor portion of the breaker room 11 and rotatably supporting the screw rod 17. Numerical reference 19 designates a nut screwed with the screw rod 17. Numerical reference 20 designates a fixed plate mounted on the nut 19 by a bolt 21 so as to interpose the dolly frame 15 between a protrusion 19a of the nut 19 and the fixed piece. Numerical reference 22 designates an operating handle, which is in a state that an engaging portion thereof is connected to a driving portion 17a having a hexagonal cross-sectional shape, formed on one side of the screw rod 17. Numerical reference 23 designates a shutter covering a front surface of the driving portion 17a. Numerical reference 24 designates a stopper in a cylindrical shape, which is mounted on an outer periphery of the screw rod 17 so as not to be fixed to the screw rod 17, wherein the stopper prevents the nut 19 from further rightward moving by being in contact with the nut 19.

Numerical reference 25 designates an interlocking pin, i.e. an interlocking member, mounted on a main body of the breaker 1 so as to be movable in vertical directions, wherein the interlocking pin does not upward move in a state downward descending when the breaker 1 is closed. Thus, by driving the breaker in the directions of inserting and drawing, and making the screw rod 17 rotatable and the nut 19 movable, dimensions of the screw rod 17 can be determined by an inserting and drawing stroke regardless of sizes of the dolly frame 15, whereby it is not necessary to keep various stocks of screw rods, and therefore a production becomes easy. Further, because the screw rod 17 is mounted on a side of the switch gear, the screw rod 17 does not outward protrude from the breaker 1 when it is not assembled with the drawing apparatus, whereby a space occupied by the breaker 1 is reduced, and the space is efficiently used in a manufacturing factory, at a location of installing the breaker, and at time of transportation. Further, because the drawing apparatus has a structure of mounting on the floor plate of the breaker room 11 and a lower side of the dolly frame 15 of the breaker 1 is engaged with the drawing apparatus, there is an effect that the drawing apparatus can be easily attached by simply mounting the drawing apparatus on the floor plate 11a. Further, because the dolly frame 15 is engaged with the drawing apparatus by the nut 19, it is almost unnecessary to process the dolly frame 15, whereby the structure becomes simple.

Figure 4:
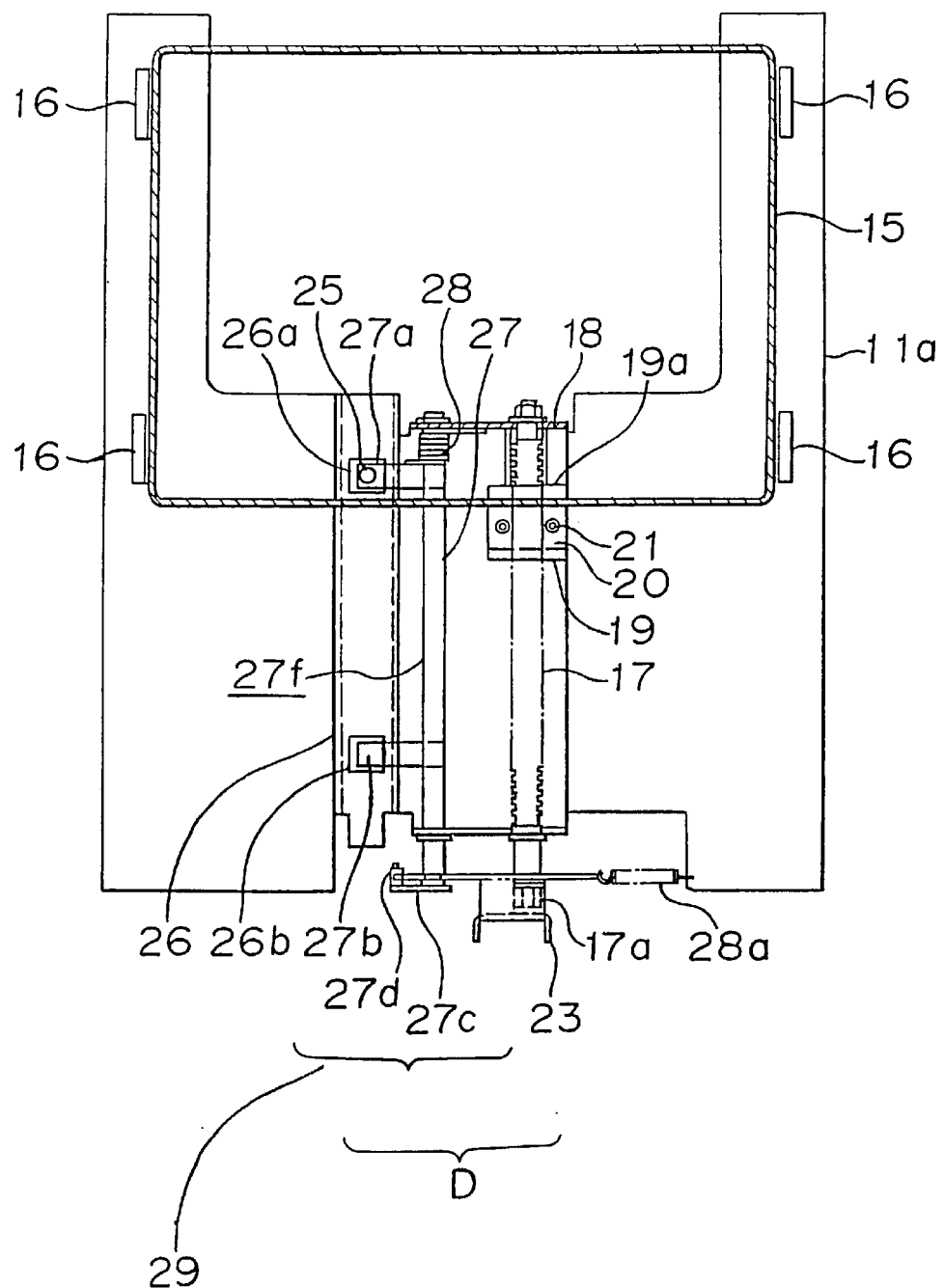
FIG. 4 is a cross-sectional plan view in a direction B—B in FIG. 3.

FIG. 4 is a plan cross-sectional view of FIG. 3 viewed in a direction of B—B. In FIG. 4, numerical reference 26 designates a position holding member in a cross-sectional U-like shape of the breaker having rectangular holes engaged with the interlocking pin 25 of the breaker 1 in an upper portion thereof. The rectangular hole 26a is an engaging hole in a connecting position of the breaker 1, and the rectangular hole 26b is an engaging hole in a disconnecting position. Numerical reference 27 designates a shaft rotatably supported by the support member in parallel with the screw rod 17. Numerical references 27a and 27b designates arms perpendicularly extending from the shaft 27, which integrally rotate with the shaft 27, and being a detecting portion detecting the making and breaking state of the breaker 1 in contact with the interlocking pin respectively below the rectangular holes 26a and 26b. Numerical reference 27c designates an arm mounted at one end of the shaft 27 and integrally rotating with the shaft 27, wherein a rotatable roller 27d is attached to a tip end portion of the arm. The arm 27c is an output portion, which has a function of taking out a signal of the making and breaking state of the breaker 1, detected by the arms 27a and 27b, to an outside. An assembly, made of the shaft 27 through the roller 27d, is called an interlocking rod. Numerical reference 28 designates a torsion spring, counterclockwise urging the shaft 27, mounted on the outer periphery of the shaft 27. An assembly, made of the shaft 27, the arms 27a through 27c, the roller 27d, and the torsion spring 28, is called a making and breaking state detecting means 29. The shutter 23 is engaged with the screw rod 17 and a groove on one end of the shaft 27 so as to be horizontally slidable in FIG. 4. A left end of the shutter 23 is engaged with the roller 27d, and a right end of the shutter 23 is rightward urged by a tension spring 28a, wherein the shutter 23 is ordinarily held in the closing state.

Thus, assembling the making and breaking state detecting means 29 and the shutter 23, it is possible to obtain the making and breaking detecting device being securely operated with a simple structure.

Figure 5:
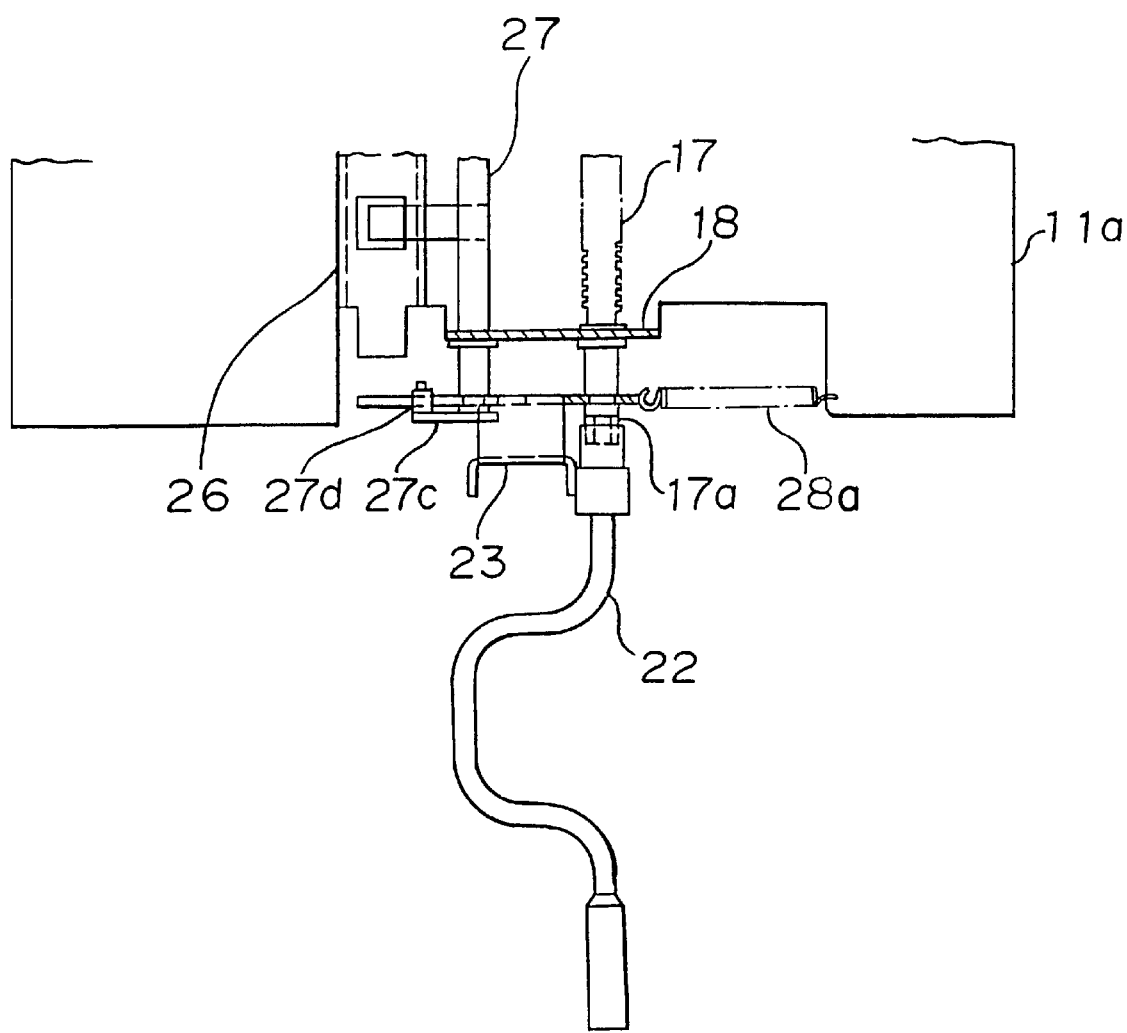
FIG. 5 is a cross-sectional plan view illustrating a state that an operating handle is mounted in the state illustrated in FIG. 4.

FIG. 5 is a partial plan cross-sectional view illustrating a state that the shutter 23 is leftward slid and the engaging portion of the handle 22 is joined to the driving portion 17a of the screw rod 17, wherein it is changed from a state illustrated in FIG. 4.

Figure 6:
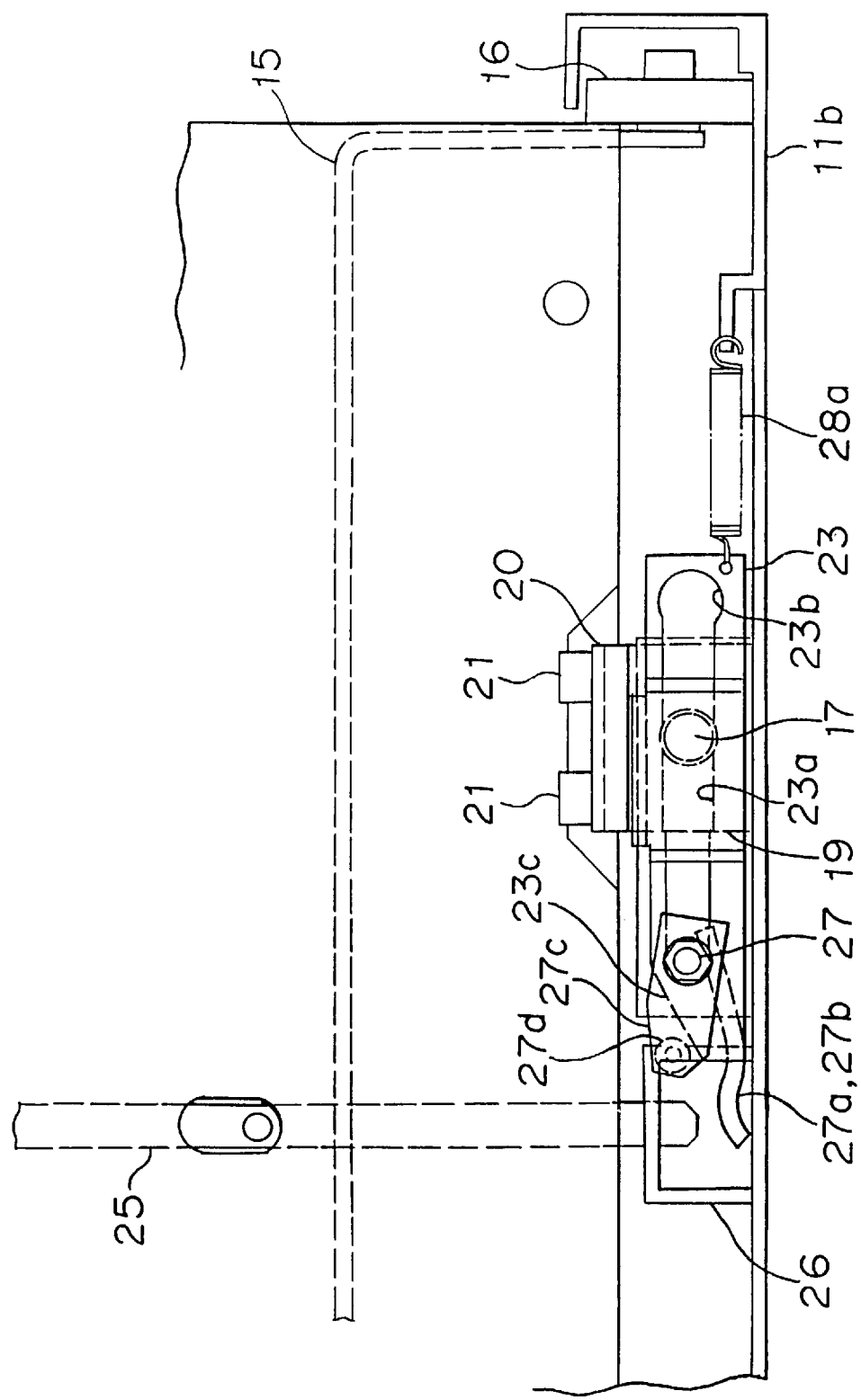
FIG. 6 is a partly omitted front view in a direction C—C of FIG. 3, wherein the breaker is closed and a shutter is closed.

FIG. 6 is a front view of FIG. 3 viewed in a direction C—C. In FIG. 6, a laterally elongated hole 23a is formed in the shutter 23, the hole 23a is horizontally movable with respect to the end portions of the screw rod 17 and the shaft 27. FIG. 6 illustrates the closing state of the breaker 1, wherein the interlocking pin 25 is downward moved. For drawing and inserting the breaker 1, the shutter 23 is leftward slid to position a large diameter hole 23b on a right end of the elongated hole 23a in front of the screw rod 17, and the engaging portion of the handle 22 is inserted through the large diameter hole 23b to join the driving portion 17a. However, as illustrated in FIG. 6, when it is required to leftward slide the shutter 23, the roller 27d in contact with a slanted portion 23c of the shutter 23 is pushed up. However, the roller 27d, the arm 27c, i.e. the output portion, the shaft 27, and the arms 27a and 27b, i.e. the detecting portions, can not clockwise rotate around the shaft 27 after tips of the arms 27a and 27b are in contact with a tip of the interlocking pin 25. As a result, it is impossible to leftward slide the shutter 23, whereby the drawing apparatus cannot be operated.

Figure 7:
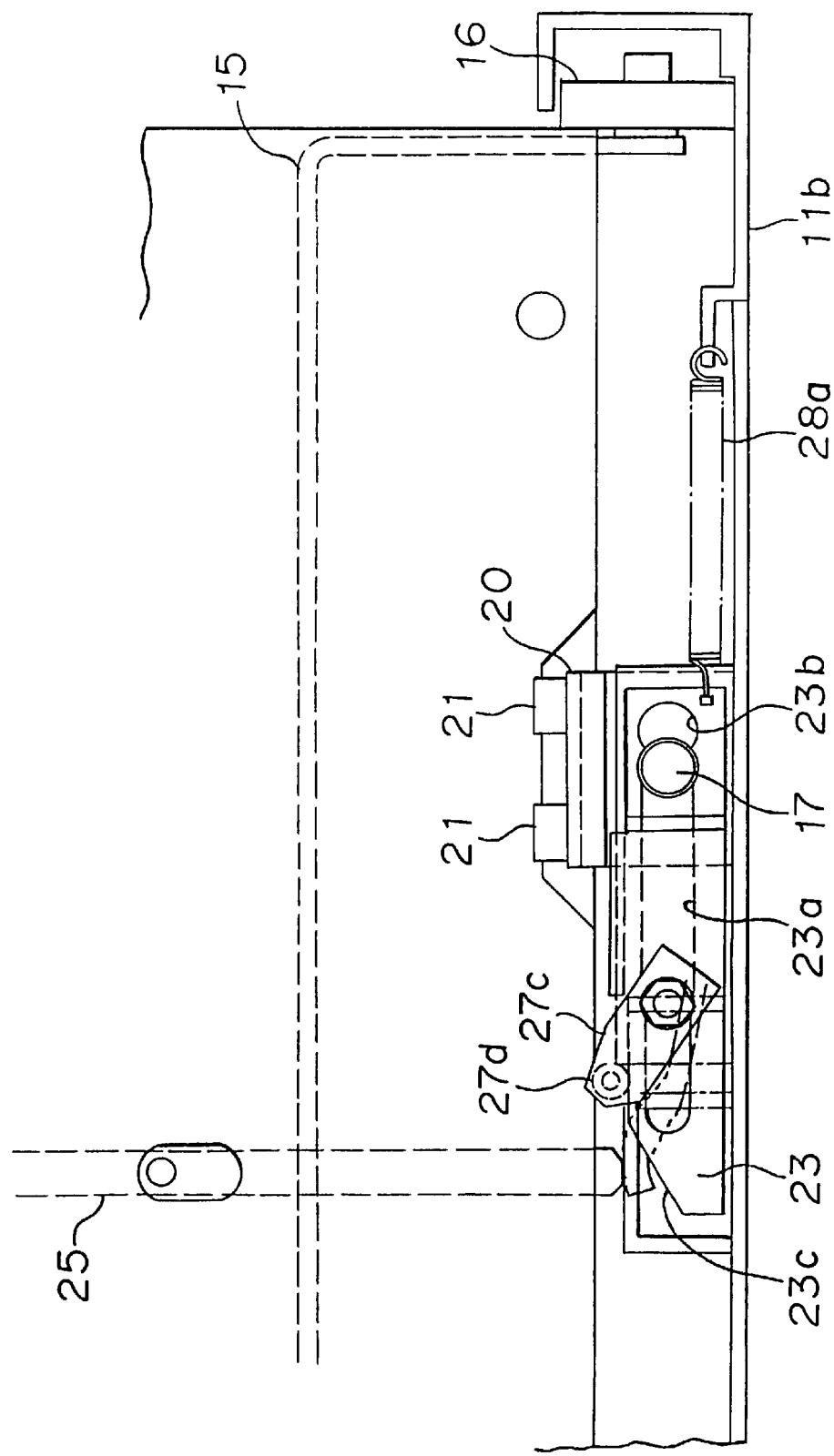
FIG. 7 is a partial front view illustrating a state that the breaker is opened and the shutter is just before opened, changed from the state illustrated in FIG. 6.
Figure 8:
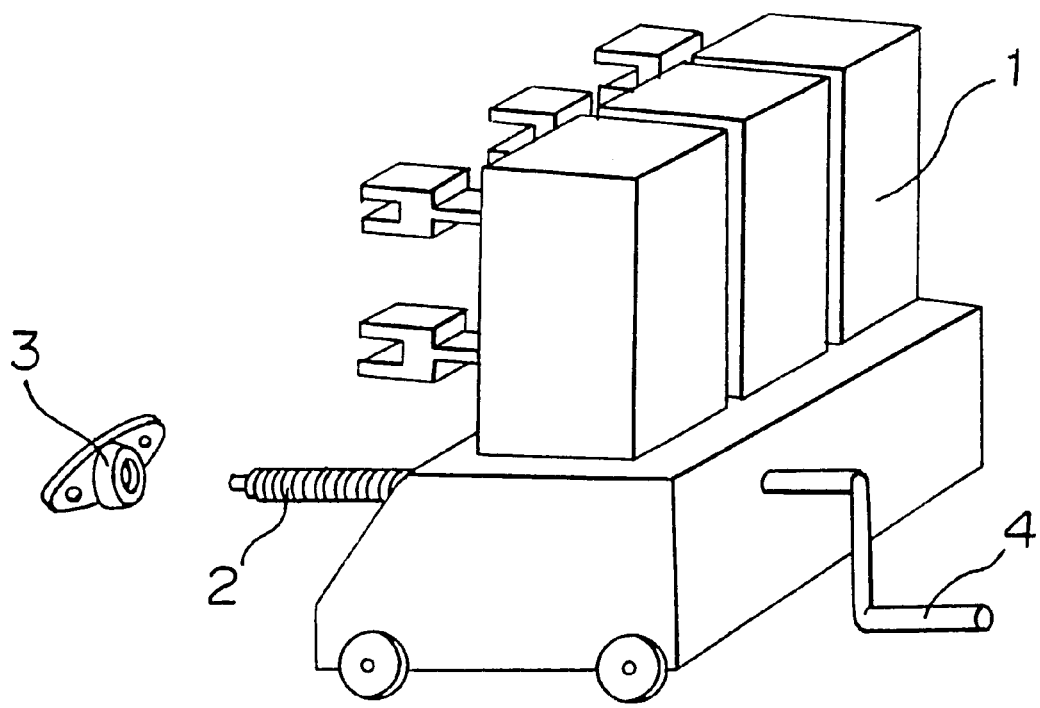
FIG. 8 is a perspective view illustrating a conventional drawing apparatus of a breaker.

FIG. 7 illustrates the opening state of the breaker 1, wherein the interlocking pin is upward moved. Therefore, when the shutter 23 is leftward driven, the slanted portion 23c pushes up the roller 27d. Since the tips of the arms 27a and 27b, i.e. the detecting portions, interlocked with the roller 27d is upward moved by the clockwise rotation of the shaft, the shutter 23 is leftward slid pushing up the roller 27d. As a result, the large diameter portion 23b of the elongated hole 23a comes in front of the screw rod 17, whereby it is possible to insert the engaging portion of the handle 22 through the large diameter hole 23b to join to the driving portion 17a. FIG. 7 is a state just before the large diameter hole 23b comes a front of the screw rod 17.

By rightward or leftward rotating the handle 22 in predetermined directions of drawing and inserting, the screw rod 17 is rotated, and the nut 19, screwed with the screw rod 17, forward or backward moves in the breaker room 11. Because the protruding portion 19a of the nut 19 and the fixed piece 20 hold a lower portion of the dolly frame 15 of the breaker 1, the breaker 1 moves on a drawing side, i.e. a coming direction in FIG. 7, or an inserting side, i.e. a going direction in FIG. 7, by the movement of the nut 19. Thereafter, by extracting the operation handle 22, the shutter 23 rightward moves by the tension spring 28a to close a front surface of the screw rod 17.

Embodiment 2

Although the breaker is exemplified as the drawing type electric machinery in Embodiment 1, the invention is not limited to a breaker, and effects similar to those described in Embodiment 1 can be demonstrated for all make break switches including, for example, a load-break switch, a contactor, and ground make break switch.

Embodiment 3

Although, the breaker is exemplified as the drawing type electrical machinery in Embodiment 1, needless to say that the invention may be applied to electrical machineries without a make break switching function such as a transformer, a capacitor, and an instrument transformer as long as the electrical machineries are in contact with or separated from a main circuit by inserting or drawing out. Because it is not necessary to confirm opening and closing states of the electrical machineries in such a case, the making and breaking state detecting means may be abolished, and instead it is necessary to insert or draw out in an unloaded state after checking a state of applying a current by a current applying state detecting means, located in the main circuit.

Embodiment 4

Although an example that the supporting member 18 is located on the floor plate 11a of the breaker room 11, it becomes possible to increase a rate of work outside a switch gear by constructing the screw rod 17, the support member 18, the shutter 23, the position holding member 26, the making and breaking state detecting means 29 on a single base having a width D, as a unit illustrated in FIG. 4, and by mounting this unit on the floor plate 11a. Therefore, it is possible to simplify an assembling work in the switch gear, which causes to make an work period long. Further, in case that the making and breaking state detecting means 29 is individually grounded, the unit may include only the base, the screw rod 17, and the supporting member 18.

Embodiment 5

Further, although a case that the drawing apparatus is attached to a lower portion of the breaker 1, a position of attaching the drawing apparatus may be a side portion or an intermediate portion of the breaker.

The first advantage of the drawing apparatus according to the present invention is that electrical machineries in many sizes can be handled by the drawing apparatus.

The second advantage of the drawing apparatus according to the present invention is that the drawing apparatus can be easily installed inside the switch gear.

The third advantage of the drawing apparatus according to the present invention is that making and breaking operations are safe because making and breaking states of a make break switch are detected.

The fourth advantage of the drawing apparatus according to the present invention is that the making and breaking state detecting means having a simple structure, which means can securely detect the making and breaking states of the make break switch, is obtainable.

The fifth advantage of the drawing apparatus according to the present invention is that the shutter, which is easily interlocked with the making and breaking state detecting means, is obtainable.

The sixth advantage of the drawing apparatus according to the present invention is that the assembling work for the drawing apparatus becomes easy.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 11-211988 filed on Jul. 27, 1999 including specification, claims, drawings and summary are incorporated herein by reference in its entirety.

What is claimed is:

1. A drawing apparatus comprising:
  a casing;
  a screw rod installed inside the casing and rotatably supported around an axis center along a direction of drawing an electrical machinery, the screw rod having a driving portion;

a nut installed inside the casing, the nut engaged with the electrical machinery, screwed with the screw rod, and operable to drive the electrical machinery in a direction of inserting or drawing out upon the rotation of the screw rod; and a shutter mounted on the casing for movement between (1) a first position in which the shutter completely covers a front surface of the driving portion of the screw rod and (2) a second position in which the front surface of the driving portion is revealed.

2. A drawing apparatus comprising:

a screw rod supported by a floor of an electrical machinery room so as to be rotatable around an axis center along a direction of drawing out the electrical machinery;

a nut engaging a portion of the electrical machinery and being screwed with the screw rod, the nut operable to drive the electrical machinery in directions of inserting and drawing out upon the rotation of the screw rod; and a shutter mounted on the casing for movement between (1) a first position in which the shutter completely covers a front surface of the driving portion of the screw rod and (2) a second position in which the front surface of the driving portion is revealed.

3. A drawing apparatus comprising:

a screw rod rotatably supported around an axis center along a drawing direction of a switch;

a nut engaged with the switch, screwed with the screw rod, and operable to drive the switch in directions of inserting and drawing out the switch;

making and breaking state detecting means for detecting a making state and a breaking state of the switch; and a shutter completely covering a front surface of a driving portion of the screw rod, engaged with the making and breaking state detecting means on one side thereof, and being movable to a position of revealing the front surface of the driving portion of the screw rod only when the making and breaking state detecting means detects the breaking state.

4. A drawing apparatus comprising:

a screw rod rotatably supported around an axis center along a drawing direction of a switch;

a nut engaged with the switch, screwed with the screw rod, and driving the switch in directions of inserting and drawing out the switch by moving the switch in the directions;

making and breaking state detecting means for detecting a making state and a breaking state of the switch; and a shutter closing a front surface of a driving portion of the screw rod, engaged with the making and breaking state detecting means on one side thereof, and being movable in a position of releasing the front surface of the driving portion of the screw rod only in case that the making and breaking state detecting means detects the breaking state, wherein the making and breaking state detecting means includes an interlocking member installed in the switch and moving between making and breaking positions of the switch; and an interlocking rod having a shaft rotatably supported in parallel with the screw rod, an arm-like detector, rotated along with the shaft, engaged with the interlocking member, and detecting the making and breaking states of the switch, and an arm-like actuator located in one end of the shaft and outputting a detected state.

5. The drawing apparatus according to claim 4, wherein the shutter is located on the front surface of the driving portion of the screw rod so as to be freely slidable in directions perpendicular to a longitudinal direction of the screw rod, and the sliding action of the shutter in a direction that releases the front surface of the driving portion rotates the interlocking rod in contact with the interlocking member of the switch by an engagement between one side of the shutter and a roller, which is located in a tip of a displaying portion of the interlocking rod of the making and breaking state detecting means.

6. The drawing apparatus according to claim 3, wherein the screw rod, the making and breaking state detecting means, and the shutter are constructed to be a single unit in a common base.

7. The drawing apparatus according to claim 4, wherein the screw rod, the making and breaking state detecting means, and the shutter are constructed to be a single unit on a common base.

8. The drawing apparatus according to claim 5, wherein the screw rod, the making and breaking state detecting means, and the shutter are constructed to be a single unit on a common base.

* * * * *